United States Patent
Joshi et al.

(10) Patent No.: US 9,519,556 B2
(45) Date of Patent: Dec. 13, 2016

(54) MEMBER REPLACEMENT IN AN ARRAY OF INFORMATION STORAGE DEVICES

(71) Applicant: Dell Products, LP, Round Rock, TX (US)

(72) Inventors: Neeraj Joshi, Puducherry (IN); Vishnu M. Karrotu, Bangalore (IN); Kavi K. Chakkravarthy, Vellore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 192 days.

(21) Appl. No.: 14/481,325

(22) Filed: Sep. 9, 2014

(65) Prior Publication Data

US 2016/0070628 A1     Mar. 10, 2016

(51) Int. Cl.
*G06F 11/00* (2006.01)
*G06F 11/20* (2006.01)

(52) U.S. Cl.
CPC ....... *G06F 11/2094* (2013.01); *G06F 2201/81* (2013.01)

(58) Field of Classification Search
CPC .......................... G06T 11/2094; G06T 11/2056
See application file for complete search history.

(56) References Cited

U.S. PATENT DOCUMENTS

| | | | | |
|---|---|---|---|---|
| 7,146,522 B1 * | 12/2006 | Rowe | ................. | G06F 11/2094 369/47.13 |
| 7,337,353 B2 * | 2/2008 | Yamamoto | ............ | G06F 3/0617 714/47.2 |
| 7,500,136 B2 | 3/2009 | Miyoshi et al. | | |
| 8,650,435 B2 | 2/2014 | Vishnu et al. | | |
| 2006/0015771 A1 * | 1/2006 | Van Gundy | ......... | G06F 11/2094 714/6.32 |
| 2007/0083706 A1 * | 4/2007 | Rawe | ................... | G06F 3/0607 711/114 |
| 2009/0063768 A1 * | 3/2009 | Kalos | ................... | G06F 3/0607 711/114 |
| 2009/0172277 A1 | 7/2009 | Chen | | |
| 2009/0177918 A1 * | 7/2009 | Abali | ................. | G06F 11/1092 714/6.32 |
| 2010/0070796 A1 * | 3/2010 | Sivaperuman | ...... | G06F 11/2094 714/5.1 |
| 2010/0205372 A1 * | 8/2010 | Daikokuya | ........... | G06F 3/0607 711/114 |
| 2013/0346794 A1 * | 12/2013 | Bartlett | ............... | G06F 11/2094 714/6.21 |
| 2014/0075240 A1 * | 3/2014 | Maeda | ................ | G06F 11/2069 714/6.23 |

* cited by examiner

*Primary Examiner* — Philip Guyton
(74) *Attorney, Agent, or Firm* — Larson Newman, LLP

(57) ABSTRACT

An information handling system includes a method for detecting a predictive failure indication for a predictive failure indicated physical disk of a disk group, determining an amount of used storage capacity of a lowest capacity physical disk of the disk group, and comparing a replacement physical disk storage capacity of a replacement physical disk to the used storage capacity. When the replacement physical disk capacity is greater than or equal to the used storage capacity even if the replacement physical disk capacity is less than a lowest storage capacity of the lowest capacity physical disk of the disk group, replacing the predictive failure indicated physical disk with the replacement physical disk.

17 Claims, 4 Drawing Sheets

MEMBER REPLACEMENT IN AN ARRAY OF INFORMATION STORAGE DEVICES

FIELD OF THE DISCLOSURE

The present disclosure generally relates to information handling systems, and more particularly relating to member replacement in an array of information storage devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtuatized architectures. Data and voice communications among information handling systems may be via networks that are wired, wireless, or some combination.

One subsystem of an information handling system is a storage subsystem. A storage subsystem can be implemented using a redundant array of inexpensive disks (RAID). A RAID storage subsystem comprises a RAID controller and a disk group (DG). The DG comprises a plurality of physical disks (PDs) configured to store information which is presented to the information handling system as being stored on a virtual disk (VD) even though the storage of the information is distributed among the PDs. A PD of the PDs may be replaced by a replacement PD through the use a member replacement feature of the RAID controller. In existing RAID storage subsystems, a PD cannot be replaced with a replacement PD of lesser information storage capacity than the capacity of the PD having the least capacity in the DG even though the replacement PD may be of greater capacity than the used space of PDs in the DG.

For example, a RAID level 0 DG may comprise two PDs, wherein one has a 100 gigabyte (GB) capacity and another has a 200 GB capacity, and two VDs, wherein one has a capacity of 40 GB and another has a capacity of 60 GB. In such an example, the used space in each PD is only 50 GB (i.e., 20 GB+30 GB in each PD). If an attempt is made to replace the 200 GB PD with a replacement PD of the same drive type and of a capacity less than the least capacity of any PD in the DG (i.e., 100 GB) but greater than the used space of each PD in the DG (i.e., 50 GB), then the RAID controller does not allow for member replacement, even though the actual used space in each PD is only 50 GB.

As a RAID level 0 VD does not provide data redundancy, if the RAID controller detects a predictive failure indication fir one of the RAID level 0 PDs in the DG, then it is crucial for the customer to change the indicated PD as soon as possible with a replacement PD provided its replacement PD capacity is greater than or equal to the capacity of whichever PD has the smallest capacity of any PD in the DG. Otherwise, drive failure of the indicated PD storing information for the RAID level 0 VD results in complete data loss. If no replacement PD having a capacity equal to or greater than the capacity of the PD having the least capacity among the PDs of the DG is available, then the RAID controller does not allow for member replacement even if a PD of lesser capacity is available. Thus, data loss may result because of unavailability of a replacement PD of adequate capacity to satisfy the requirements of the RAID controller. While the above example is described with respect to RAID level 0, such a drawback can apply to RAID subsystems of other RAID levels such as RAID levels 1, 5, 6, 10, 50, and 60.

BRIEF DESCRIPTION OF THE DRAWINGS

It will be appreciated that for simplicity and clarity of illustration, elements illustrated in the Figures are not necessarily drawn to scale. For example, the dimensions of sonic elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
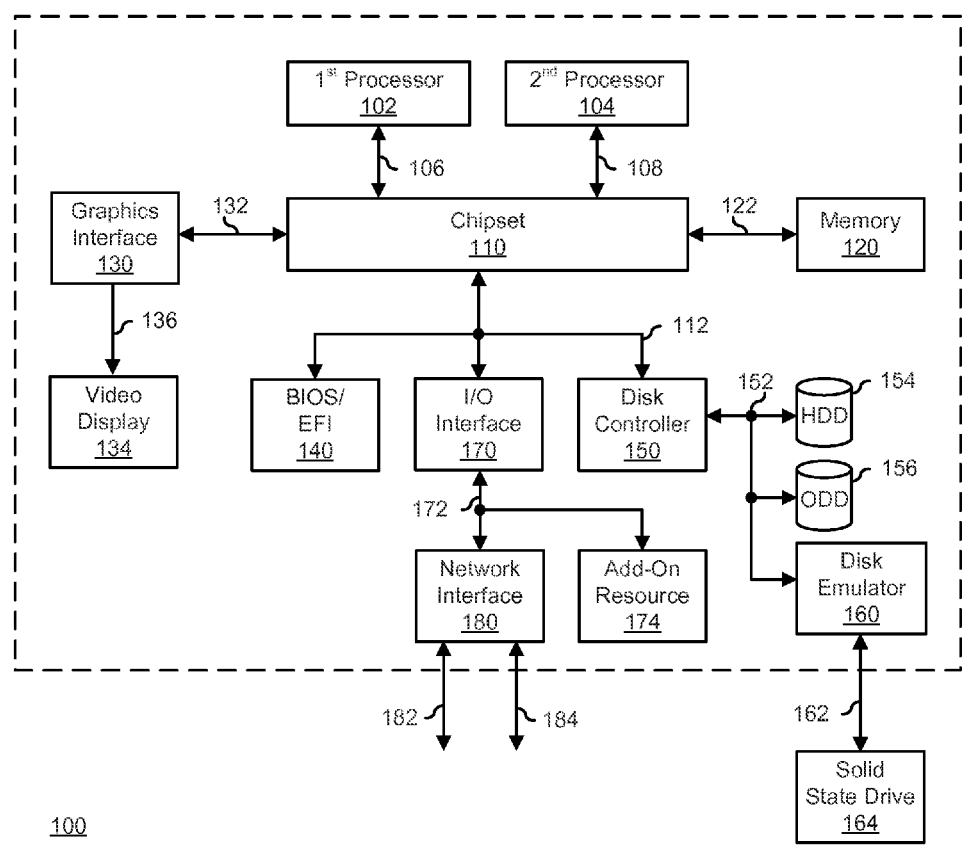
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PM) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/Ell code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources(not illustrated). The network resource can include another information handling system, a data storage system, another network, a grid management system, another suitable resource, or a combination thereof.

Figure 2:
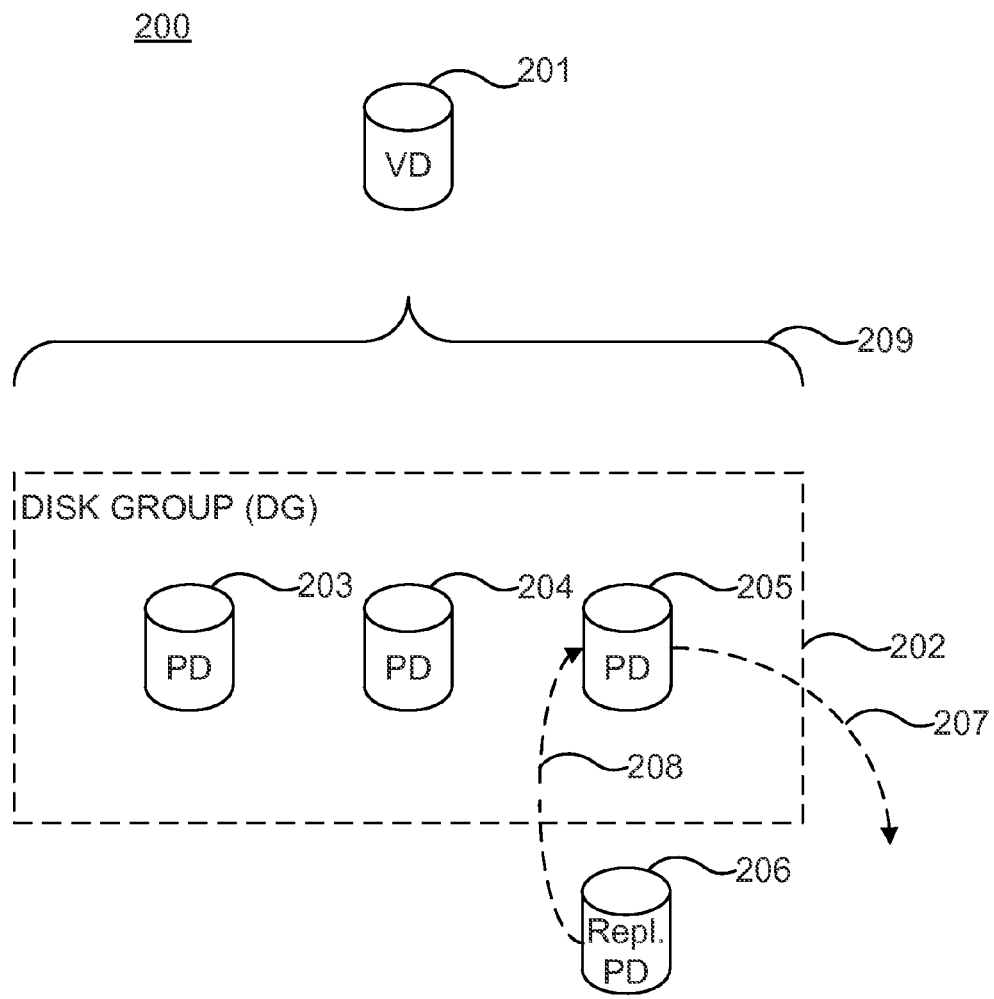
FIG. 2 is a flow diagram illustrating a virtual disk and its relationship to a disk group comprising physical disks according to an embodiment of the present disclosure.

FIG. 2 is a flow diagram illustrating a virtual disk and its relationship to a DG comprising PDs according to an embodiment of the present disclosure. RAID storage subsystem 200 comprises, from a physical perspective, DG 202. DG 202 comprises a plurality of PDs 203, 204, and 205. A RAID controller presents information stored on PDs 203, 204, and 205 in DG 202 as being stored on VD 201 in accordance with RAID mapping 209. Thus, RAID storage subsystem 200 comprises, from a logical perspective, VD 201.

To achieve member replacement, with replacement PD 206 replacing PD 206, removal 207 is performed to remove PD 205 from DG 202 and addition 208 is performed to add replacement PD 206 to DG 202. A used portion of the capacity of PD 205 is used to store information of all VDs for which DG 202 provides physical storage. An unused portion of the capacity of PD 205 remains unused when PD 205 is storing information of all VDs for which DG 202 provides physical storage. By allowing member replacement to occur using any replacement PD 206 having a capacity at least as great as the used portion of the capacity of PD 205, the RAID controller controlling RAID storage subsystem 200 can enhance the member replacement capability of RAID storage subsystem 200. Such enhanced member replacement capability can increase flexibility utilization of replacement PDs and can improve reliability of RAID storage subsystem 200.

Figure 3:
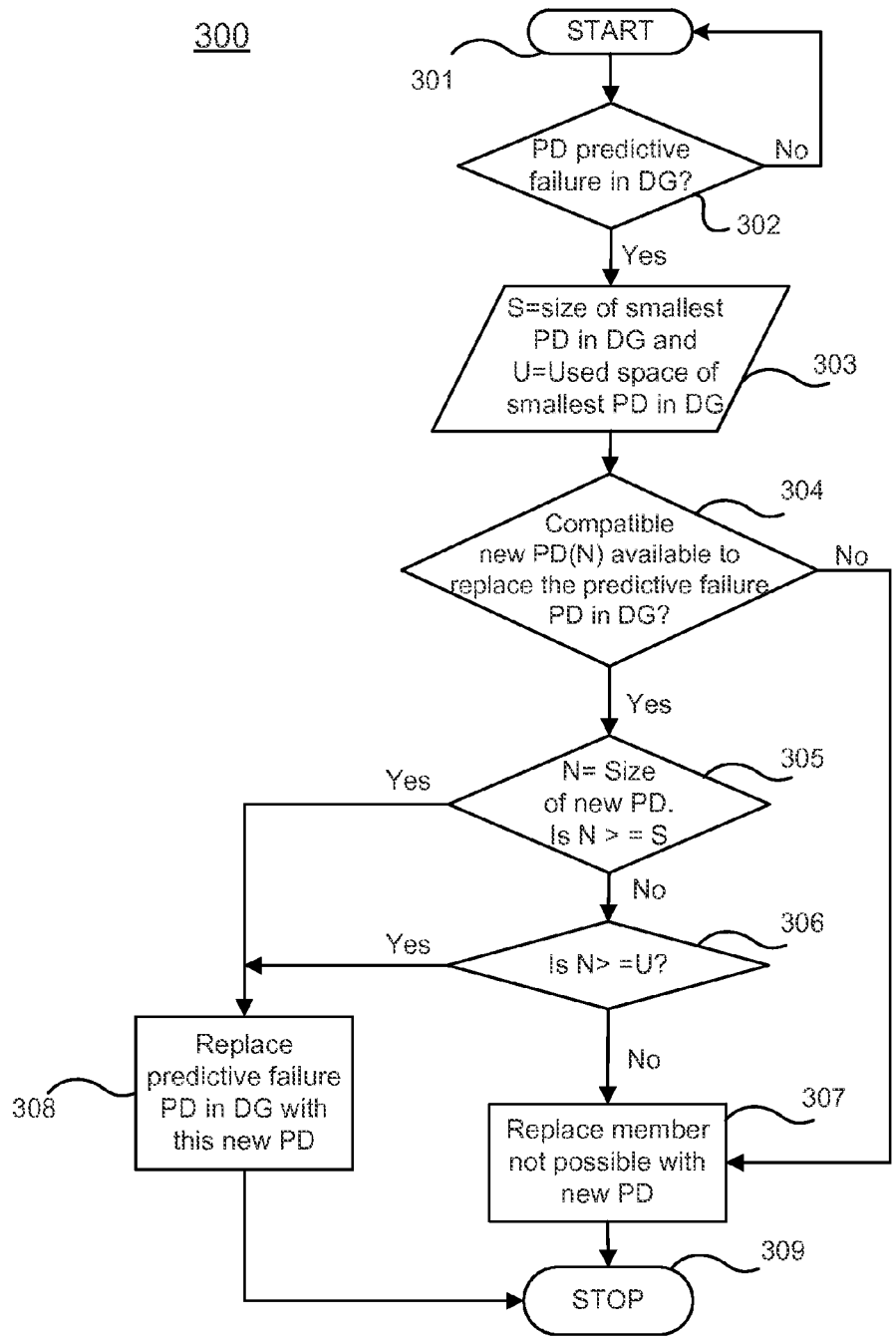
FIGS. 3 and 4 are flow diagrams illustrating a method for enhanced RAID member replacement according to an embodiment of the present disclosure.

FIG. 3 is a flow diagram illustrating a method for enhanced RAID member replacement according to an embodiment of the present disclosure. Method 300 begins in block 301. From block 301, method 300 continues to decision block 302. In decision block 302, a decision is made as to whether or not a PD predictive failure indication has been detected for a PD in the DG. If not, method 300 returns to block 301. If, however, a PD predictive failure indication has been detected, method 300 continues to block 303. In block 303, a capacity (e.g., "size"), denoted as S, of the PD having the least capacity (e.g., "smallest") of all PDs in the DG and an amount of used capacity (e.g., "used space"), denoted as U, of the PD having the least capacity of all PDs in the DG are determined. From block 303, method 300 continues to decision block 304. In decision block 304, a decision is made as to whether or not a compatible replacement PD (e.g., "new PD"), denoted PD(N), is available to replace the PD in the DG for which the predictive failure indication has been detected. If not, method 300 continues to block 307, which shall be discussed below. If, however, a compatible replacement PD is available, method 300 continues to decision block 305. In decision block 305, a decision is made as to whether or not a capacity (e.g., "size"), denoted as N, of the compatible replacement PD is greater than or equal to the capacity S of the PD having the least capacity of all PDs in the DG. If so, method 300 continues to block 308. In block 308, the PD for which the predictive failure indication was received is replaced with the compatible replacement PD. From block 308, method 300 continues to block 309. Method 300 ends in block 309.

If in block 305, the decision is made that the capacity N of the compatible replacement PD is not greater than or equal to the capacity S of the PD having the least capacity of all PDs in the DG, method 300 continues to decision block 306. In decision block 306, a decision is made as to whether or not capacity N of the compatible replacement PD is greater than or equal to the amount of used capacity U of the PD having the least capacity of all PDs in the DG. If so, method 300 continues to block 308. If not, method 300 continues to block 307. In block 307, a determination is made that member replacement is not possible with the compatible replacement PD, and the PD for which the predictive failure indication was detected is not replaced by the compatible replacement PD. From block 307, method 300 continues to block 309, where method 300 ends.

Figure 4:
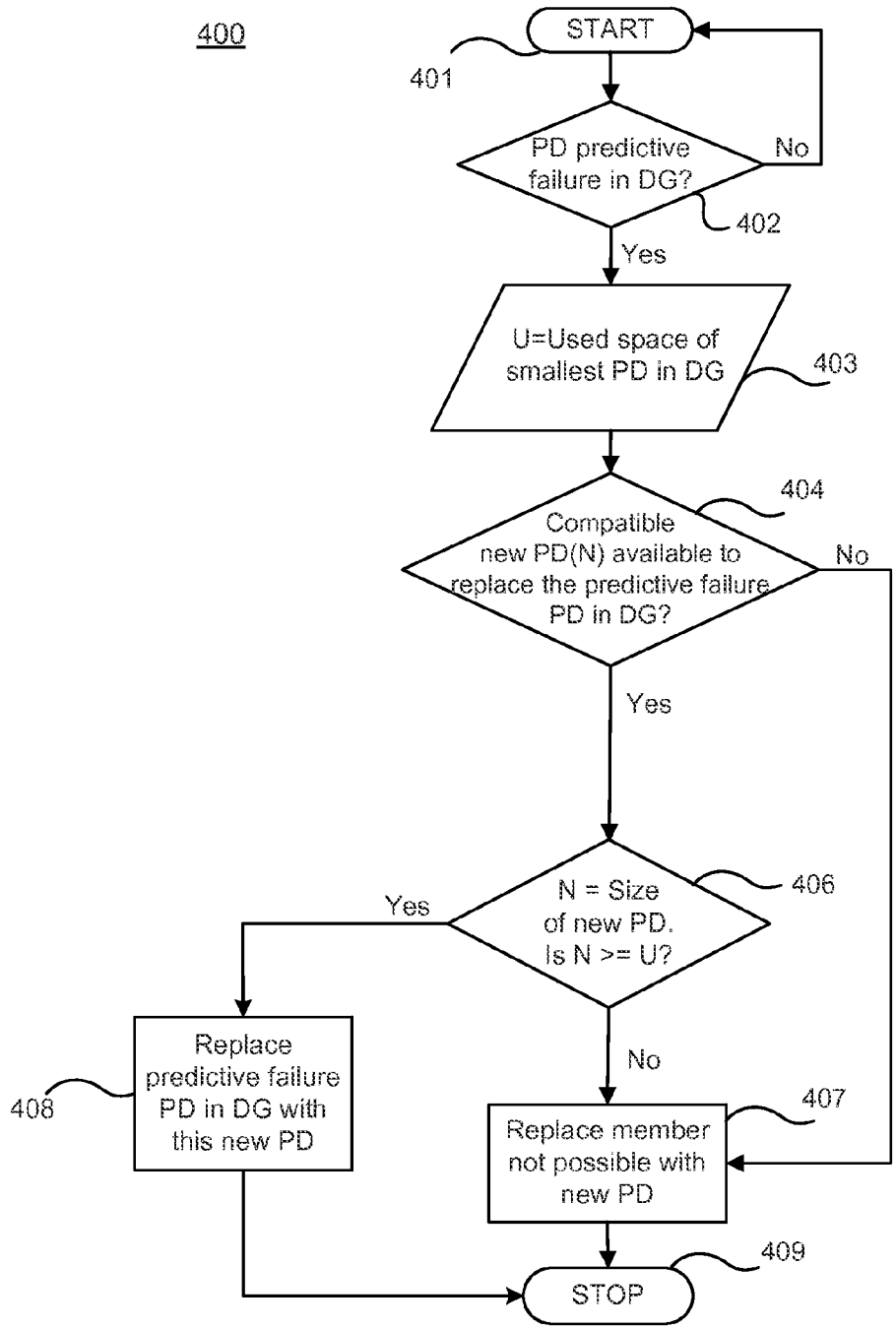

FIG. 4 is a flow diagram illustrating a method for enhanced RAID member replacement according to an embodiment of the present disclosure. Method 400 begins in block 401. From block 401, method 400 continues to decision block 402. In decision block 402, a decision is made as to whether or not a PD predictive failure indication has been detected for a PD in the DG. If not, method 400 returns to block 401. If, however, a PD predictive failure indication has been detected, method 400 continues to block 403. In block 403, an amount of used capacity (e.g., "used space"), denoted as U, of the PD having the least capacity of all PDs in the DG is determined. From block 403, method 400 continues to decision block 404. In decision block 404, a decision is made as to whether or not a compatible replacement PD (e.g., "new PD"), denoted PD(N), is available to replace the PD in the DG for which the predictive failure indication has been detected. If not, method 400 continues to block 407, which shall be discussed below. If, however, a compatible replacement PD is available, method 400 continues to decision block 406.

In decision block 406, a decision is made as to whether or not capacity N of the compatible replacement PD is greater than or equal to the amount of used capacity U of the PD having the least capacity of all PDs in the DG. If so, method 400 continues to block 408. In block 408, the PD for which the predictive failure indication was received is replaced with the compatible replacement PD. From block 408, method 400 continues to block 409. Method 400 ends in block 409. If, in decision block 406, a decision is made that capacity N of the compatible replacement PD is not greater than or equal to the amount of used capacity U of the PD having the least capacity of all PDs in the DG, method 400 continues to block 407. In block 407, a determination is made that member replacement is not possible with the compatible replacement PD, and the PD for which the predictive failure indication was detected is not replaced by the compatible replacement PD. From block 407, method 400 continues to block 409, where method 400 ends.

In accordance with at least one embodiment, as a RAID storage subsystem is used by a customer in the field, member replacement upon detection of a predictive failure indication for a PD to avoid data loss in RAID level 0 VD going to a failed state and other RAID levels such as 1, 5, 6, 10, 50, and 60 going to a degraded state is sometimes more critical than preserving the storage capacity of a configured DG. However, in the event of a predictive failure indication in a RAID DG, other PDs available for use as a replacement PD for member replacement of the PD to which the predictive failure indication was detected may be of less information storage capacity than the capacity of the PDs used in original DG.

In such situation, the RAID controller is configured to allow membership replacement with a replacement PD of less capacity than the PD having the least capacity of any PD in the original DG, wherein the capacity of the replacement PD is larger than the amount of capacity used by data for one or more VDs stored on a PD of the DG. In such case, there is reduction of capacity in the DG by employing a lower capacity replacement PD, but such reduction is reversible, not necessarily permanent. Once a higher capacity replacement PD becomes available, a customer can go ahead and replace the lower capacity replacement PD with the higher capacity PD and restore the storage capacity of the original DG.

In accordance with at least one embodiment, a RAID controller is configured to check and to allow a member replacement operation with a lower capacity replacement than the PD of least capacity in the DG, provided physical disk usage size of the PD of least capacity in the DG is less than or equal to the capacity of the lower capacity replacement PD.

In accordance with at least one embodiment, if the capacity 'S' is the information storage capacity of the lowest capacity PD in DG, if the amount of data 'U' is the amount of data stored in the portion of the lowest capacity used to store data of the RAID storage subsystem, and the capacity 'N' is the information storage capacity of the new PD being considered as a candidate to replace the PD in the DO for which the predictive failure indication was detected, then member replacement proceeds as described below. As a first case, if N>=S, then the replace member feature replaces the PD for which the predictive failure indication was detected. As a second case, if N<S, then check N>=U (i.e., used disk space) in the DG. If N>=U, then replace the PD for which the predictive failure indication was detected with the new lower capacity PD(N) available. 3. If N<S and also N<U (i.e. used space of lowest capacity PD in the DG), then no replace member is possible with the new disk PD(N). If a customer tries to perform a replace member operation with a lower capacity replacement PD than the lowest capacity PD in the DG, but the PD usage of the lowest capacity PD in the DG is higher than the lower capacity replacement PD, then the RAID controller prevents the replace member from proceeding with the lower capacity replacement PD.

In accordance with at least one embodiment, configuring a RAM controller to provide a replace member feature with a customer available lower capacity physical disk of lower capacity than the lowest capacity PD in the DG upon conditions met, can reduce the risk of data loss in a RAID level 0 VD and can prevent the VD from going into a degraded state in other RAID level RAID storage subsystems such as those of any of RAID levels 1, 5, 6, 10, 50, and 60. Whenever a customer has anew PD of a capacity of at least the capacity of the lowest capacity PD of the original DG, then a member replace operation can be performed to replace the lower capacity replacement PD with the new PD, thus restoring at least the initial storage capacity of the DG.

There may be concern that the DG capacity is reduced by replacing with a PD with a lower capacity replacement PD, but that concern could be a secondary concern to customers/users overshadowed by a risk of data loss before a larger capacity replacement PD could be obtained and installed. Any DG capacity reduction is reversible and can be reversed by subsequently replacing the lower capacity replacement PD with a larger capacity replacement PD, thereby restoring the storage capacity of the DG back to at least the original storage capacity of the DG.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network. resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card international Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   detecting a predictive failure indication for a predictive failure indicated physical disk of a disk group in an information storage subsystem;

determining an amount of used storage capacity of a lowest capacity physical disk of the disk group;

comparing a replacement physical disk storage capacity of a replacement physical disk to the used storage capacity;

when the replacement physical disk capacity is greater than or equal to the used storage capacity even if the replacement physical disk capacity is less than a lowest storage capacity of the lowest capacity physical disk of the disk group, replacing the predictive failure indicated physical disk with the replacement physical disk; and when a higher capacity replacement physical disk having a higher capacity than the lowest storage capacity becomes available, replacing the replacement physical disk with the higher capacity replacement physical disk.

2. The method of claim 1 further comprising:

when the replacement physical disk capacity is not greater than or equal to the used storage capacity, preventing replacement of the predictive failure indicated physical disk with the replacement physical disk.

3. The method of claim 1 further comprising:

comparing the replacement physical disk storage capacity to the lowest storage capacity; and when the replacement physical disk capacity is greater than or equal to the lowest storage capacity, replacing the predictive failure indicated physical disk with the replacement physical disk.

4. The method of claim 1, further comprising:

determining whether the replacement physical disk is of a compatible type exhibiting compatibility with a type of the predictive failure indicated physical disk; and when the replacement physical disk is not of the compatible type exhibiting compatibility with the type of the predictive failure indicated physical disk, preventing replacement of the predictive failure indicated physical disk with the replacement physical disk.

5. The method of claim 1, wherein the replacing the replacement physical disk with the higher capacity replacement physical disk is performed in absence of a fault indication for the replacement physical disk.

6. The method of claim 3, wherein the comparing the replacement physical disk storage capacity to the lowest storage capacity is performed before the comparing the replacement physical disk storage capacity of the replacement physical disk to the used storage capacity.

7. An information handling system comprising:

a disk group comprising an array of physical disks, the physical disks comprising a predictive failure indicated physical disk and a lowest capacity physical disk; and a disk controller coupled to the disk group, the disk controller configured to detect a predictive failure indication for the predictive failure indicated physical disk of the disk group, to determine an amount of used storage capacity of the lowest capacity physical disk of the disk group, to compare a replacement physical disk storage capacity of a replacement physical disk to the used storage capacity, and, when the replacement physical disk capacity is greater than or equal to the used storage capacity even if the replacement physical disk capacity is less than a lowest storage capacity of the lowest capacity physical disk of the disk group, to replace the predictive failure indicated physical disk with the replacement physical disk, wherein the disk controller is configured to compare the replacement physical disk storage capacity to the lowest storage capacity before comparing the replacement physical disk storage capacity of the replacement physical disk to the used storage capacity.

8. The information handling system of claim 7, wherein the disk controller is further configured, when the replacement physical disk capacity is not greater than or equal to the used storage capacity, to prevent replacement of the predictive failure indicated physical disk with the replacement physical disk.

9. The information handling system of claim 7, wherein the disk controller is further configured to compare the replacement physical disk storage capacity to the lowest storage capacity, and, when the replacement physical disk capacity is greater than or equal to the lowest storage capacity, to replace the predictive failure indicated physical disk with the replacement physical disk.

10. The information handling system of claim 7, wherein the disk controller is further configured to determine whether the replacement physical disk is of a compatible type exhibiting compatibility with a type of the predictive failure indicated physical disk, and, when the replacement physical disk is not of the compatible type exhibiting compatibility with the type of the predictive failure indicated physical disk, to prevent replacement of the predictive failure indicated physical disk with the replacement physical disk.

11. The information handling system of claim 7, wherein the disk controller is further configured, when a higher capacity replacement physical disk having a higher capacity than the lowest storage capacity becomes available, to replace the replacement physical disk with the higher capacity replacement physical disk.

12. The information handling system of claim 11, wherein disk controller is configured to replace the replacement physical disk with the higher capacity replacement physical disk in absence of a fault indication for the replacement physical disk.

13. A nontransitory computer readable medium comprising instruction code executable by a processor to cause the processor to:

detect a predictive failure indication for a predictive failure indicated physical disk of a disk group in an information storage subsystem;

determine an amount of used storage capacity of a lowest capacity physical disk of the disk group;

compare a replacement physical disk storage capacity of a replacement physical disk to the used storage capacity;

when the replacement physical disk capacity is greater than or equal to the used storage capacity even if the replacement physical disk capacity is less than a lowest storage capacity of the lowest capacity physical disk of the disk group, to replace the predictive failure indicated physical disk with the replacement physical disk; and when a higher capacity replacement physical disk having a higher capacity than the lowest storage capacity becomes available, to replace the replacement physical disk with the higher capacity replacement physical disk.

14. The nontransitory computer readable medium of claim 13 further comprising instruction code executable by the processor to cause the processor, when the replacement physical disk capacity is not greater than or equal to the used storage capacity, to prevent replacement of the predictive failure indicated physical disk with the replacement physical disk.

15. The nontransitory computer readable medium of claim 13 further comprising instruction code executable by the processor to cause the processor to compare the replacement physical disk storage capacity to the lowest storage capacity, and, when the replacement physical disk capacity is greater than or equal to the lowest storage capacity, to replace the predictive failure indicated physical disk with the replacement physical disk.

16. The nontransitory computer readable medium of claim 13 further comprising instruction code executable by the processor to cause the processor to determine whether the replacement physical disk is of a compatible type exhibiting compatibility with a type of the predictive failure indicated physical disk, and, when the replacement physical disk is not of the compatible type exhibiting compatibility with the type of the predictive failure indicated physical disk, to prevent replacement of the predictive failure indicated physical disk with the replacement physical disk.

17. The nontransitory computer readable medium of claim 13, wherein the instruction code executable by the processor to cause the processor to replace the replacement physical disk with the higher capacity replacement physical disk is performed in absence of a fault indication for the replacement physical disk.

* * * * *